(12) United States Patent
Kaga et al.

(10) Patent No.: US 8,514,060 B2
(45) Date of Patent: *Aug. 20, 2013

(54) WIRELESS IDENTIFICATION TAG

(75) Inventors: Kikuo Kaga, Tokyo (JP); Shigeo Ashizawa, Tokyo (JP)

(73) Assignee: Mitomo Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,339

(22) Filed: Feb. 24, 2012

(65) Prior Publication Data

US 2012/0199658 A1    Aug. 9, 2012

Related U.S. Application Data

(63) Continuation-in-part of application No. 12/292,684, filed on Nov. 24, 2008, now Pat. No. 8,149,121.

(30) Foreign Application Priority Data

May 21, 2008   (JP) ................................. 2008-133273

(51) Int. Cl.
*H04Q 5/22*    (2006.01)

(52) U.S. Cl.
USPC ... 340/10.1; 340/10.4; 340/573.3; 340/572.1; 340/539.13; 235/375; 235/376; 235/385

(58) Field of Classification Search
USPC ............ 340/572.1, 10.4, 573.3, 539.13, 10.1; 235/375, 376, 385
See application file for complete search history.

(56) References Cited

U.S. PATENT DOCUMENTS

| | | | |
|---|---|---|---|
| 3,647,470 A | 3/1972 | Tsuda | |
| 3,967,011 A | 6/1976 | Dunn et al. | |
| 4,703,253 A | 10/1987 | Strommen | |
| 4,992,794 A * | 2/1991 | Brouwers | ...................... 342/51 |
| 5,492,980 A * | 2/1996 | Moriwaki | .................... 525/429 |
| 5,563,341 A | 10/1996 | Fenner et al. | |
| 5,627,749 A | 5/1997 | Waterman et al. | |

(Continued)

FOREIGN PATENT DOCUMENTS

| | | |
|---|---|---|
| DE | 199 60 356 | 8/2001 |
| EP | 1 909 218 | 4/2008 |

(Continued)

OTHER PUBLICATIONS

European Search Report issued Jun. 11, 2010 in European Patent Application No. 08019789.0.

*Primary Examiner* — Benjamin C Lee
*Assistant Examiner* — Quang D Pham
(74) *Attorney, Agent, or Firm* — Wenderoth, Lind & Ponack, L.L.P.

(57) ABSTRACT

The present invention is aimed at providing a wireless identification tag which can save information with high reliability that is free from the possibility of being lost or falsified, is not broken or melt in the concrete, can expand directionality of an antenna, be distributed in a cement product to be in an appropriate condition for radio communication, and has good adhesion and affinity with cement or the like. A wireless identification tag 1 mixed in a cement product in the manufacturing procedure thereof in which cement, an aggregate, water, or the like are mixed including a protection body 2 incorporating the wireless identification tag 1 having an antenna portion which can write/read information by radio communication, wherein a concave portion 3 is provided on the surface of the protection body.

18 Claims, 10 Drawing Sheets

(56) References Cited

U.S. PATENT DOCUMENTS

| | | | |
|---|---|---|---|
| 5,697,384 A * | 12/1997 | Miyawaki et al. | 128/899 |
| 5,840,148 A | 11/1998 | Campbell et al. | |
| 5,895,235 A * | 4/1999 | Droz | 438/127 |
| 5,963,132 A * | 10/1999 | Yoakum | 340/572.1 |
| 6,026,818 A * | 2/2000 | Blair et al. | 128/899 |
| 6,142,888 A * | 11/2000 | Higuchi et al. | 473/374 |
| 6,202,596 B1 | 3/2001 | Lopez et al. | |
| 6,251,997 B1 * | 6/2001 | Imai et al. | 525/191 |
| 6,265,472 B1 * | 7/2001 | Fujii et al. | 524/88 |
| 6,400,338 B1 * | 6/2002 | Mejia et al. | 343/873 |
| 6,475,443 B1 * | 11/2002 | van Deursen et al. | 422/549 |
| 6,495,367 B1 * | 12/2002 | Isogawa et al. | 436/18 |
| 6,639,402 B2 | 10/2003 | Grimes et al. | |
| 6,690,182 B2 | 2/2004 | Kelly et al. | |
| 6,720,866 B1 | 4/2004 | Sorrells et al. | |
| 6,864,382 B2 | 3/2005 | Kurosaki | |
| 6,946,950 B1 * | 9/2005 | Ueno et al. | 340/10.1 |
| 7,034,660 B2 | 4/2006 | Watters et al. | |
| 7,098,263 B2 * | 8/2006 | Mitsunaga et al. | 524/445 |
| 7,189,788 B2 * | 3/2007 | Machida et al. | 525/240 |
| 7,239,921 B2 * | 7/2007 | Canfield et al. | 607/48 |
| 7,289,839 B2 * | 10/2007 | Dimmer et al. | 600/407 |
| 7,422,107 B2 | 9/2008 | Burns et al. | |
| 7,535,363 B2 * | 5/2009 | Gisselberg et al. | 340/572.5 |
| 7,551,058 B1 | 6/2009 | Johnson et al. | |
| 7,777,628 B2 | 8/2010 | Tilson, Jr. | |
| 7,778,687 B2 * | 8/2010 | Dimmer et al. | 600/424 |
| 7,786,867 B2 | 8/2010 | Hamel et al. | |
| 7,804,406 B2 | 9/2010 | Kaga et al. | |
| 7,911,344 B2 | 3/2011 | August et al. | |
| 7,965,188 B2 | 6/2011 | Geissler | |
| 8,111,162 B2 * | 2/2012 | Barnes et al. | 340/572.1 |
| 8,149,121 B2 * | 4/2012 | Kaga et al. | 340/572.1 |
| 8,196,589 B2 * | 6/2012 | Gisselberg et al. | 128/899 |
| 2001/0001176 A1 | 5/2001 | Lopez et al. | |
| 2001/0005700 A1 | 6/2001 | Kasashima et al. | |
| 2002/0032081 A1 * | 3/2002 | Ogg | 473/378 |
| 2002/0055400 A1 | 5/2002 | Higuchi et al. | |
| 2002/0058553 A1 | 5/2002 | Higuchi et al. | |
| 2002/0061793 A1 | 5/2002 | Higuchi et al. | |
| 2002/0067266 A1 | 6/2002 | Lee et al. | |
| 2002/0086744 A1 | 7/2002 | Ichikawa et al. | |
| 2002/0086928 A1 * | 7/2002 | Ouchi | 524/409 |
| 2002/0180602 A1 * | 12/2002 | Yoakum | 340/572.8 |
| 2002/0188470 A1 | 12/2002 | Hogan | |
| 2003/0008730 A1 | 1/2003 | Hayashi et al. | |
| 2003/0034408 A1 | 2/2003 | Kurosaki | |
| 2003/0052785 A1 * | 3/2003 | Gisselberg et al. | 340/572.8 |
| 2003/0088025 A1 * | 5/2003 | Ogawa et al. | 525/107 |
| 2003/0229169 A1 * | 12/2003 | Han et al. | 524/400 |
| 2004/0030021 A1 * | 2/2004 | Mitsunaga et al. | 524/442 |
| 2004/0108612 A1 | 6/2004 | Yamaki et al. | |
| 2004/0113790 A1 | 6/2004 | Hamel et al. | |
| 2004/0132551 A1 | 7/2004 | Aoyama et al. | |
| 2004/0176520 A1 * | 9/2004 | Machida et al. | 524/449 |
| 2004/0250819 A1 * | 12/2004 | Blair et al. | 128/899 |
| 2005/0033819 A1 | 2/2005 | Gambino et al. | |
| 2005/0143194 A1 | 6/2005 | Sato et al. | |
| 2005/0156707 A1 | 7/2005 | Kudo | |
| 2005/0181891 A1 | 8/2005 | Umezawa et al. | |
| 2006/0022056 A1 * | 2/2006 | Sakama et al. | 235/492 |
| 2006/0114109 A1 | 6/2006 | Geissler | |
| 2006/0122007 A1 * | 6/2006 | Savarese et al. | 473/351 |
| 2006/0125636 A1 | 6/2006 | Nishida et al. | |
| 2006/0232425 A1 | 10/2006 | Ueno | |
| 2006/0267774 A1 * | 11/2006 | Feinberg et al. | 340/572.8 |
| 2006/0281583 A1 * | 12/2006 | Sato et al. | 473/351 |
| 2007/0096880 A1 * | 5/2007 | Nagai | 340/10.41 |
| 2007/0096916 A1 * | 5/2007 | Liu | 340/572.7 |
| 2007/0135234 A1 * | 6/2007 | Nagasawa | 473/353 |
| 2007/0170089 A1 | 7/2007 | Burns et al. | |
| 2007/0222232 A1 * | 9/2007 | Held | 292/307 R |
| 2007/0229277 A1 * | 10/2007 | Usami | 340/572.7 |
| 2008/0045359 A1 | 2/2008 | Shannon et al. | |
| 2008/0067228 A1 | 3/2008 | Kaga et al. | |
| 2008/0085784 A1 | 4/2008 | Watanabe et al. | |
| 2008/0211629 A1 * | 9/2008 | Evans et al. | 340/10.1 |
| 2008/0252425 A1 | 10/2008 | Okegawa et al. | |
| 2008/0252458 A1 * | 10/2008 | Chen et al. | 340/572.1 |
| 2008/0252483 A1 * | 10/2008 | Hodges | 340/905 |
| 2010/0073138 A1 * | 3/2010 | Suzuki et al. | 340/10.1 |
| 2011/0253793 A1 * | 10/2011 | King | 235/492 |
| 2011/0254667 A1 * | 10/2011 | Popescu | 340/10.42 |

FOREIGN PATENT DOCUMENTS

| | | |
|---|---|---|
| JP | 10-183509 | 7/1998 |
| JP | 11-345299 | 12/1999 |
| JP | 2004-141483 | 5/2004 |
| JP | 2005-267227 | 9/2005 |
| JP | 2005-330729 | 12/2005 |
| JP | 2006-183257 | 7/2006 |
| JP | 2007-26454 | 2/2007 |
| JP | 2008-63900 | 3/2008 |

* cited by examiner

WIRELESS IDENTIFICATION TAG

This application is a continuation-in-part of application Ser. No. 12/292,684, filed Nov. 24, 2008 now U.S. Pat. No. 8,149,121.

BACK GROUND OF INVENTION

1. Field of the Invention

The present invention relates to a wireless identification tag used for a quality control system or the like of a concrete product or an architectural structure. Especially, the present invention relates to a wireless identification tag, which is mixed in a production procedure of a cement product in which cement, an aggregate, water or the like are mixed to be used in an architectural structure, using a nonvolatile memory device (FeRAM) having an antenna portion that enables writing/reading of various information such as information regarding a cement product when manufactured.

2. Prior Art

In a concrete product or a concrete architectural structure related to civil engineering, information such as concrete strength or history of engineering works needs to be examined in case of maintenance or a disaster such as earthquake. Such information has been recorded on paper to be managed with a drawing or the like. However, there is a possibility that the papers are lost or information therein is falsified. Moreover, in recent years, such information is recorded in a database of a computer other than on paper. However, even this cannot prevent possibility of loss or falsification and therefore a conventional concrete quality management system is not exactly reliable for an owner of the concrete architectural structure or a user of the system.

Moreover, a method of attaching an IC tag in which distribution management information of an architectural material or the like is recorded to an architectural material or a wall of the architectural structure (e.g., Patent Document 1) or a method of embedding a wireless identification tag in concrete before being hardened (e.g., Patent Documents 2 and 3) has been known. In addition, a wireless identification tag which is mixed in a cement product during a manufacturing procedure thereof in which cement, an aggregate, water, or the like are mixed has been invented (Patent Document 4).

[Patent Document 1]: Japanese Unexamined Patent Application Publication No. 2004-141483
[Patent Document 2]: Japanese Unexamined Patent Application Publication No. 2005-330729
[Patent Document 3]: Japanese Unexamined Patent Application Publication No. 2006-183257
[Patent Document 4]: Japanese Unexamined Patent Application Publication No. 2008-63900

However, in a case where an IC tag is attached or embedded as in the above-mentioned conventional methods, the IC tag may be exposed from the surface of an architectural material or a wall. Moreover, there is a possibility that the IC tag is broken or lost because it has to be passed through various persons until the tag is provided in the architectural structure and there is also a possibility that information recorded in the IC tag is falsified or the IC tag is replaced by another IC tag in which falsified information is recorded. In addition, in a case where a conventional IC tag is put into concrete, because of its thin and flat shape, there is a possibility that the tag is broken by the great stress applied when the concrete is mixed or cast. Further, in the conventional flat IC tag, a flat antenna is provided on the surface thereof. Because directionality of the antenna in radio communication reaches its peak in a direction orthogonal to the surface of the IC tag, sensitivity is lowered as the IC tag leans, and in a direction parallel to the IC tag surface, neither transmission nor reception can be carried out. Such a narrow directionality has been a problem.

A wireless identification tag to be mixed in a cement product, in which cement, an aggregate, water, or the like are mixed, in the manufacturing procedure has been developed. However, in a wireless identification tag to be mixed in the manufacturing procedure of a cement product, if the wireless identification tags concentrate inside of the cement product, it becomes impossible to correctly write/read information and to appropriately carry out radio communication. As a method to extend communication range, for example, it becomes possible to write in/read out information in a long distance if information communication by UHF band or shortwave band is carried out. However, in this case, there occurs a problem such as lowered information storage capacity or strengthened directionality. Therefore, it is required of a wireless identification tag to be distributed in a cement product as evenly as possible and also to be provided in the vicinity of the surface of the cast cement product.

Further, for a wireless identification tag mixed in a manufacturing procedure of a cement product to reduce the influence of the wireless identification tag to the cement product strength, it is required to improve adhesion between the cement product and the wireless identification tag. Further, the wireless identification tag itself is required of having strength to endure power applied when cement, an aggregate, water, or the like are mixed or when the mixture is cast, anti-alkaline property enough to endure alkaline property of the cement, and heat-resistance property enough to endure heat generated when mixed.

SUMMARY OF INVENTION

Therefore, to solve the above-mentioned problems, the present invention is aimed at providing a wireless identification tag to be mixed with cement or the like which can save information with high reliability that is free from the possibility of being lost or falsified, has strength, anti-alkaline property, and heat-resistance property enough to endure mixture with cement or casting of cement, is not broken or melt in the concrete, can expand directionality of an antenna, is distributed in a cement product to be in an appropriate condition for radio communication, and has good adhesion and affinity with cement or the like.

DETAILED DESCRIPTION OF THE PREFERRED EMBODIMENTS

Figure 1:
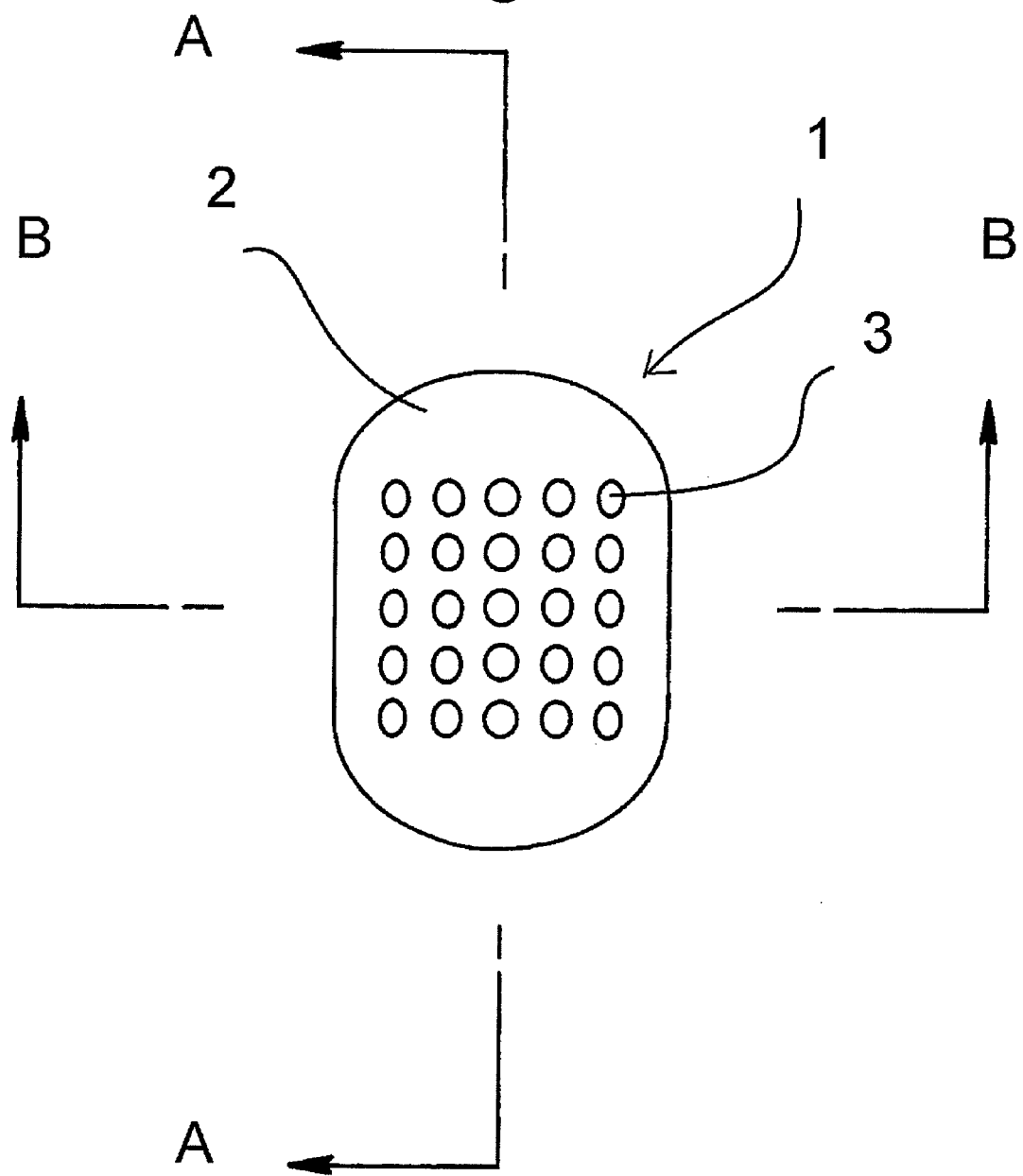
FIG. 1 A plan view of a wireless identification tag of the present invention.
Figure 2:
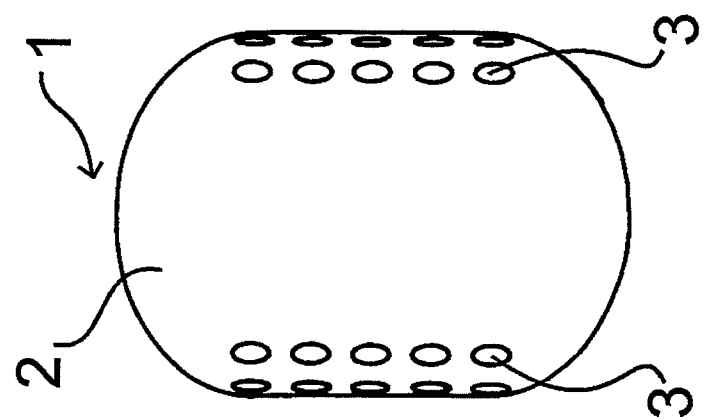
FIG. 2 A side view of the wireless identification tag shown in FIG. 1.
Figure 3:
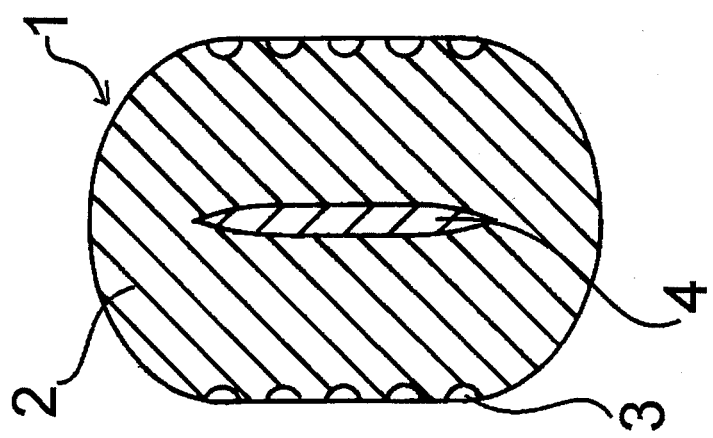
FIG. 3 A cross-sectional view taken along A-A line of the wireless identification tag shown in FIG. 1.
Figure 4:
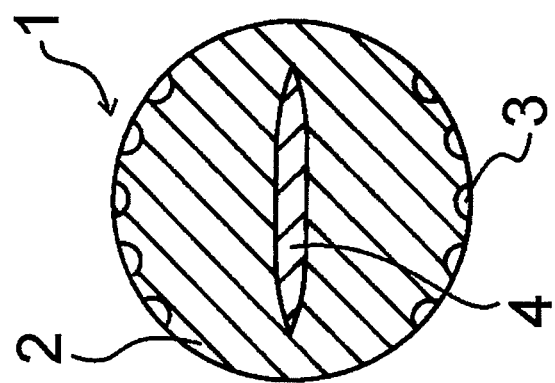
FIG. 4 A cross-sectional view taken along B-B line of the wireless identification tag shown in FIG. 1.
Figure 5:
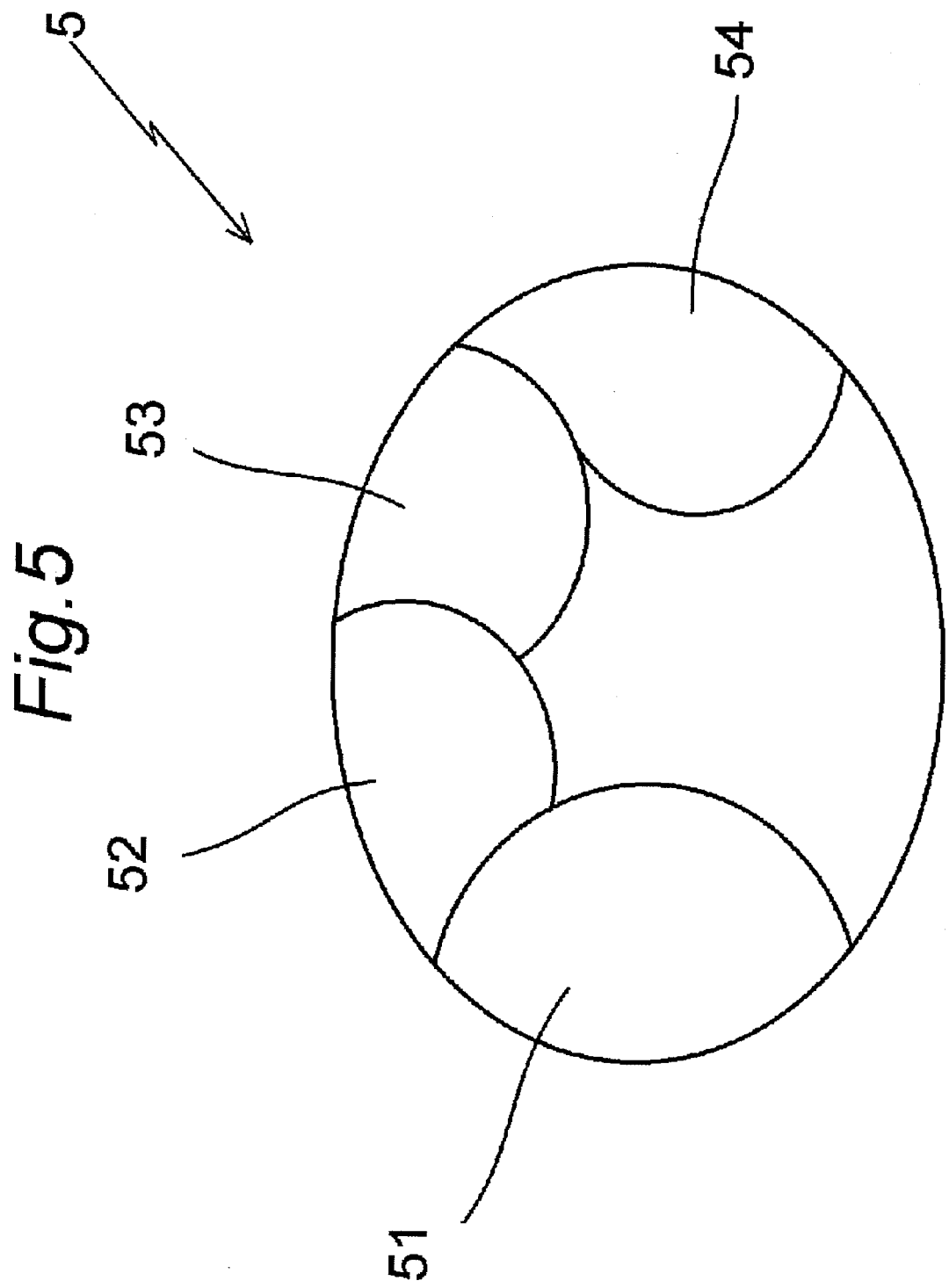
FIG. 5 An illustration of a wireless identification tag of a second embodiment of the present invention.
Figure 6:
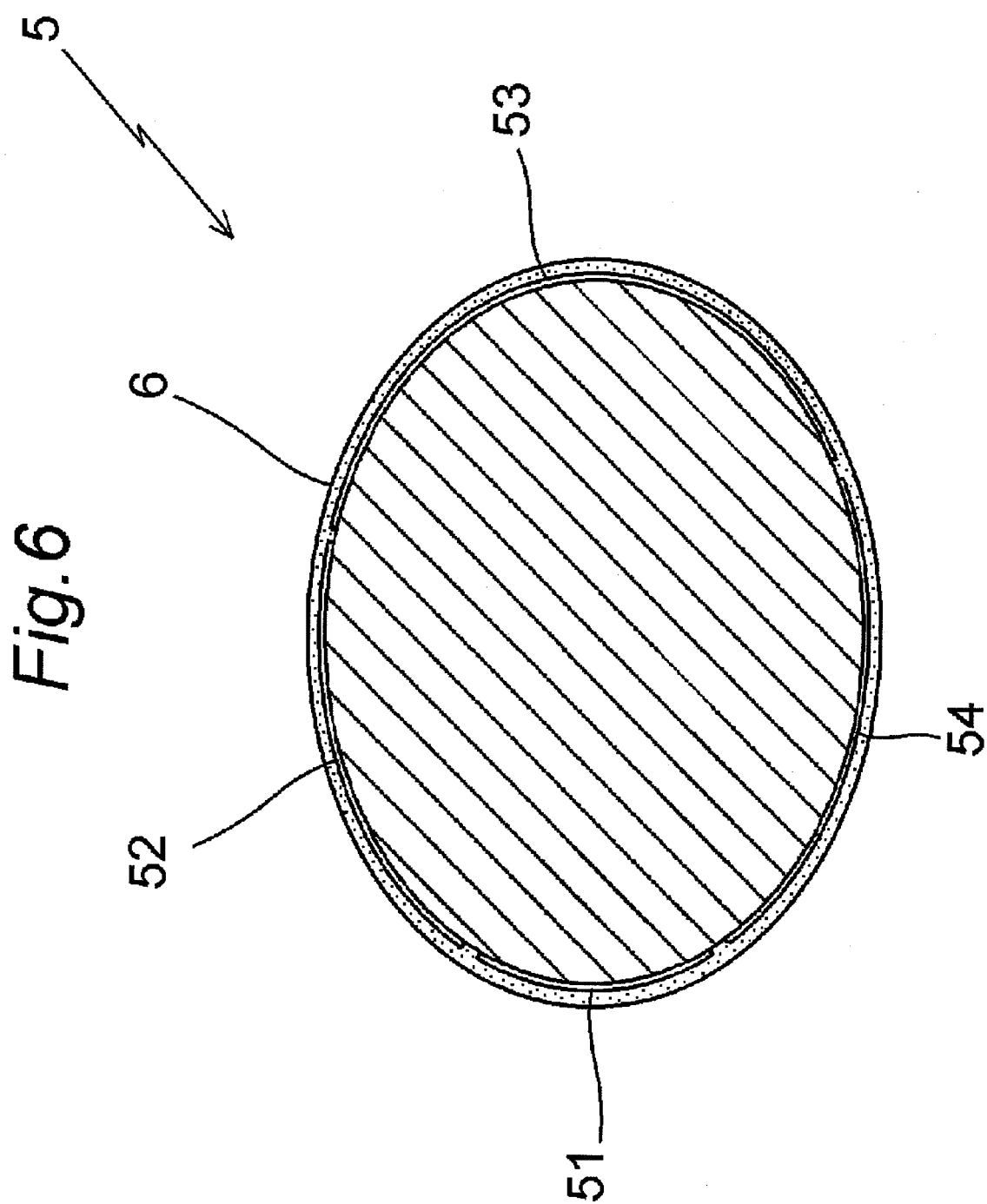
FIG. 6 An illustration of a wireless identification tag of a second embodiment of the present invention.
Figure 7:
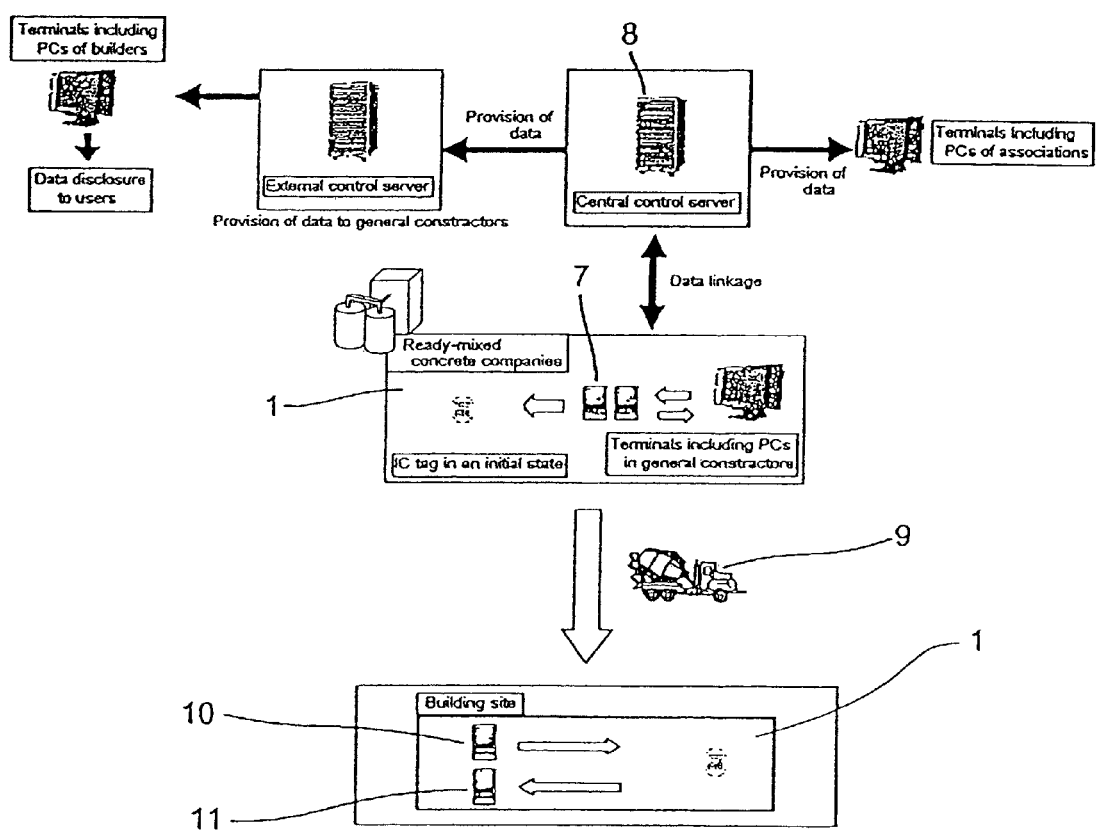
FIG. 7 An illustration of a concrete quality management system using the wireless identification tag of the present invention.

FIG. 1 is a plan view of a wireless identification tag of the present invention, FIG. 2 is a side view, FIGS. 3 and 4 are cross-sectional views and FIG. 5 is a conceptual diagram of a concrete quality management system using the wireless identification tag of the present invention.

A wireless identification tag 1 includes a wireless identification tag main body which is covered with a protection body having cubic shape such as sphere, oval, or polyhedron shape (e.g., icosadodecahedron) to have a size of between several millimeters to several tens of millimeters and glass bead-like shape. On the surface of the protection body, a concave portion is formed.

In the wireless identification tag 1 of an embodiment of the present invention, a wireless identification tag main body 4 having a shape of a chip is covered with a protection body 2 including thermoplastic resin and the protection body 2 is shaped to have a cubic shape, in the present embodiment, to have an approximately oval shape (straw rice bag shape). The surface of the protection body 2 is dimple processed to provide a plurality of concave portions 3.

The wireless identification tag main body 4 of the embodiment of the present invention is a chip-shaped FeRAM tag including a FeRAM which is a nonvolatile memory using a ferroelectric substance, a power source unit for generating electric current by receiving radio wave from outside and resonating with the radio wave instead of including a battery, an antenna portion for carrying out radio communication in a predetermined frequency bandwidth, and a control unit for controlling them. The FeRAM, the power source unit, and the control unit are mounted on a substrate and covered with an insulating material. Therefore, it is possible to write/read a large amount of information in/from the wireless identification tag main body 4 itself.

Compared to an EEPROM used for a conventional IC tag, the FeRAM has a superior performance that enables to rewrite $10^{13}$ times or more, while the EEPROM is enabled to rewrite only $10^5$ times or so. Moreover, voltage for writing of the conventional EEPROM is 12V while that for the FeRAM is between DC 1.1V and 3V, which is very low. The FeRAM does not need to include a battery, is sufficient enough to be a passive type which includes a power source unit for generating power by resonating to a radio wave from outside, and has writing speed which is 5000 times faster than the EEPROM used for a conventional IC tag. Data retention period of the FeRAM is 10 years or more. Moreover, when accessed for rewriting, while writing is carried out as a block for a conventional EEPROM or flash memory, the FeRAM can randomly rewrite by a word. The control unit for controlling writing in the FeRAM enables to add information but blocks overwriting so that information which has been written in is not falsified. It is preferable that writing and reading of data is carried out by use of encrypted protocol. Therefore, it is possible to write/read information regarding the architectural structure or other various kinds of information other than information regarding the cement product in about 8 KB memory capacity by use of a write/read apparatus by radio communication any time.

In the wireless identification tag 1, bandwidth of radio wave for radio communication is not especially limited and any bandwidth from LF band to UHF band can be used. However, in the present embodiment, because the wireless identification tag 1 has specific gravity and shape that allows the tag 1 to float on the surface of the cement product as described later, the tag 1 is suitable for radio communication by long wave band which has weak directionality and is relatively not influenced by water, dust, or metal. A reader/writer unit for writing/reading information between the wireless identification tag 1 is a write/read unit for carrying out writing/reading of information by use of electromagnetic induction which occurs between coils.

A concave portion 3 is formed on the surface of the protection body 2. There are a plurality of fine concave portions provided on the surface of the protection body 2 which are dimple processed and a cement product flows into the concave portions to obtain adhesion and affinity between the wireless identification tag 1 and the cement product. Moreover, formation of the concave portion 3 enables to improve strength of the wireless identification tag. In the present embodiment, on 25 spots of both surfaces of the wireless identification tag, that is, a total of 50 spots are dimple processed in injection molding. However, the dimple processing may be carried out to all over the surfaces or part thereof. In addition, depth of the concave portion in the present embodiment is between 0.2 and 0.5 mm or so. However, the present invention is not limited thereto. The concave portion is not limited to dimple processing and a concave hole may be provided on the protection body 2 or a concave portion may be provided by causing the protection body 2 to be curved or by causing the protection body 2 to have a concave lens shape.

It is preferable that specific gravity of the wireless identification tag 1 is within a range between 1.3 and 1.9 and in the present embodiment, the specific gravity is set to 1.5. According to a distribution test of the wireless identification tag 1 in concrete, if the tag is formed to have the specific gravity of 1.3 or less, the wireless identification tag 1 floats in the cement product and there is a possibility that the tag is exposed from the cement product surface. If the tag is formed to have the specific gravity of 1.9 or more, the wireless identification tag 1 is not distributed in the cement product and sinks or unevenly distributed therein. It is confirmed that a wireless identification tag 1 having a specific gravity of around 1.5 is distributed in the vicinity of the cement product surface most evenly. That is, in a cement product manufacturing procedure in which an aggregate, cement, water, or the like are mixed, when a plurality of wireless identification tags 1 having specific gravity of 1.5 were thrown into a cement product of 1 cubic meter, the wireless identification tags were provided in a position which was 9.3 cm from the cement product surface on average and standard deviation of 3.826, medium value of 8.00, minimum value of 4.17, and maximum value of 11.83 were obtained. Therefore, even in case of a wireless identification tag 1 having 10 cm or so of writing/reading distance in radio communication, writing/reading of information can be carried out without fail (Table 1).

It is preferable that the size of the wireless identification tag 1 is almost same as an aggregate with a cubic volume of between 100 and 300 mm$^3$. In the present embodiment, the tag 1 is formed to have an approximately oval shape (straw rice bag shape) with 17 mm in longitudinal direction and 12 mm in lateral direction, affinity of the tag 1 with the cement product is improved, and the tag 1 does not sink in the cement product. The protection body 2 includes thermoplastic resin material and covers a wireless identification tag main body 4 so that the main body 4 is positioned at the center of the protection body 2. Specifically, the protection body 2 uses alkaline fast resin material which can resist against strong alkaline property of cement with PH 12.0 to 13.0 and temperature of about 100.degree. C. applied when an aggregate, water, cement, or the like are mixed. In the embodiment of the present invention, polyamide resin is used. Especially, when polyamide MXD6 composite resin is used as a material of the protection body 2, the protection body 2 shows superior mechanical strength and elasticity modulus in a wide temperature range and it is confirmed that change in dimension or degradation in mechanical strength by absorption of water was low when mixed with an aggregate, water, cement, or the like. Here, reny (product of Mitsubishi Engineering-Plastics Corporation) in which polyamide MXD6 composite resin is strengthened by impermeable glass fiber, inorganic filler, or the like is used as the protection body 2 and the wireless identification tag is covered with the protection body 2 to be injection molded. In this case, it is confirmed that the wireless identification tag 1 covered with the protection body 2 to be injection molded can endure load of an average of 197 kgf in longitudinal direction and at least an average of 148 kgf in lateral direction. Moreover, according to an expansion test of the tag by facilitation of alkali-aggregate reaction, if the wireless identification tag 1 was put into the manufacturing procedure of a cement product including an aggregate, water, cement, or the like, an average expansion rate was 0.49%, which hardly gives influence on the cement product after hardened. Moreover, although the protection body 2 includes impermeable glass fiber, any substance having magnetic property such as ferrite is not included. Therefore, there is no influence on radio communication. Here, the thermoplastic resin to be used for the protection body 2 may be, other than polyamide resin, urethane resin, vinyl chloride resin, styrene resin, olefin resin, polyester resin, or the like.

Further, as a second embodiment of the present invention, a wireless identification tag 5 includes a FeRAM 51 which is a nonvolatile memory using a ferroelectric substance, instead of including a battery, a power source unit 52 for generating electric current by receiving radio wave from outside and resonating with the radio wave, an antenna portion 53 for carrying out radio communication, and a control unit 54 for controlling them. These components may be provided on a curved surface (or on a bent curvature) of the wireless identification tag having cubic shape along the curvature and be covered with a coating body 6 having a concave portion for protection of the components. If the antenna portion 53 is formed on the curvature, it becomes possible to carry out writing/reading of information without fail.

The wireless identification tag 1 having such a configuration is used, for example, in a concrete quality management system. First, a plurality of wireless identification tags 1 in an initial condition are prepared in a ready-mixed concrete company. The tags 1 are mixed in a cement product in the manufacturing procedure in which cement, an aggregate such as gravel, water, or the like are mixed with a ratio of, for example, one tag per one cubic meter. Then, an automatic measuring apparatus provided in a measuring procedure of the cement product measures product characteristic value of the cement product such as water/cement ratio of the cement product, cement admixture, and temperature, and at the same time an IC tag writing apparatus connected to the automatic measuring apparatus automatically writes manufacture information including the product characteristic value measured by the automatic measuring apparatus, manufactured date, and the like in the wireless identification tag 1 when the tag is mixed in. Moreover, the manufacture information written in the wireless identification tag 1 may also be recorded in a central management server 7 for central management of the concrete quality management system depending on the necessity for data link.

The cement product in which the wireless identification tags 1 are mixed is carried on the mixer truck 9 and a transporter or the like writes in transportation information such as transportation date in the wireless identification tags 1 mixed in the cement product in the mixer truck 9 by use of the IC tag writing apparatus incorporated in a personal digital assistance (PDA) and set to radio communicate with the tags 1 using an encrypted signal.

When the mixer truck 9 arrives at the construction site, a personnel at the site writes in receiving information such as receiving date, test result, and confirmation of mixture of a tag, in the wireless identification tags 1 by use of the IC tag writing apparatus incorporated in a PDA, using an encrypted signal and depending on the necessity, records the information in the central management server 7. Then, the cement product in which the wireless identification tags 1 are mixed is cast and a concrete building is built. It becomes possible for a general contractor which is in charges of the construction to add record and read building information such as bar arrangement data any time by the unit of construction zone or part of the building using an IC tag write-in unit 10 provided there. After the concrete building is thus complete, it is possible to read various information recorded in the wireless identification tag 1 in the concrete building by use of an IC tag read-out unit 11 which is incorporated in a PDA and set to radio communicate with the tags 1 using an encrypted signal. Moreover, the above-mentioned central management server 7 controls information written in the plurality of wireless identification tags 1 in a plurality of construction sites and provides the information to an constructor, client of the construction, a user, each of industry groups, or the like. Further, in an open memory space which is left open after information regarding the cement product has been written in, wiring information of the building, local information, or other various information may be written in depending on the necessity.

According to the above-mentioned configuration, on the surface of a protection body of the present invention which incorporates a wireless identification tag, which is mixed in a cement product in the manufacturing procedure thereof in which cement, an aggregate, water, or the like are mixed and includes an antenna portion for enabling writing/reading of information by radio communication, a concave portion is provided so that cement fills the concave portion provided on the protection body surface to improve adhesion between the wireless identification tag and the cement product. Therefore, the wireless identification tag does not influence the strength of the cement product after hardened and a problem such as collapse of the cement product from the portion where the wireless identification tag is mixed in does not occur. Moreover, it is possible to improve strength of the wireless identification tag itself and the incorporated wireless identification tag is not damaged.

The concave portion provided on the protection body surface is formed by dimple processing a plurality of dimples provided on the protection body surface so that cement fills in each of a plurality of fine concave portions provided on the protection body surface to improve adhesion and affinity between the wireless identification tag and the cement product. Moreover, since the concave portion is dimple processed, it becomes possible to equally provide concave portions on the surface of the wireless identification tag and, for example, it becomes possible to form the concave portion simultaneously with the injection molding of the protection body in which the wireless identification tag main body is incorporated.

The wireless identification tag is formed to have specific gravity of between 1.3 and 1.9 so that the wireless identification tags can be equally distributed in the vicinity of the surface of the concrete product without sinking in the bottom of the cement product or eccentrically located therein. Therefore, after the cement product is hardened, writing/reading by the IC tag read-out apparatus or write-in apparatus can be carried out without fail.

The wireless identification tag is caused to have a cubic volume of between 100 and 300 mm.sup.3 so that the wireless identification tags are mixed with an aggregate such as gravel and equally distributed to have a condition suitable for radio communication in the vicinity of the surface of the cement product without sinking in the bottom of the cement product or eccentrically located therein. Therefore, after the cement product is hardened, writing/reading by the IC tag read-out apparatus or write-in apparatus can be carried out without fail. The protection body includes thermoplastic resin material having anti-alkaline property and therefore even if the protection body is mixed in alkaline cement with PH 12 to 13, the wireless identification tag is not melt or expanded. Therefore, the wireless identification tag is not broken or damaged and strength of the cement product is not influenced. The protection body includes thermoplastic resin material strengthened by glass fiber or inorganic filler. Therefore even if the protection body is mixed in strong alkaline cement, the wireless identification tag is not melt or expanded. Moreover, change in dimension or decrease in strength of the protection body due to absorption of water is small and the protection body can resist against force generated when mixed or compression force applied when cement is cast. Therefore, the wireless identification tag is not broken or damaged and strength of the cement product is not influenced.

The protection body has a sphere, oval, or polyhedron cubic shape to resist against force generated when mixed with cement, aggregate, water, or the like or compression force applied when cement is cast. Therefore, the wireless identification tag is not broken or damaged.

The wireless identification tag main body includes a so-called FeRAM having a semi-conductor memory device which has semi-conducting material having nonvolatile function and a power source unit for generating electric current by resonating with the received radio wave without incorporating a battery so that faster reading/writing and larger amount of information recording compared to a conventional EEPROM can be carried out. Moreover, low-voltage driving and low power consumption are enabled, the wireless identification tag itself has longer life, and reading/writing of information can be carried out for a long period of time after casting concrete.

The wireless identification tag main body has a chip shape including a semi-conductor substrate mounting a semi-conductor which is covered with an insulating material. Therefore, strength of the tag main body can be maintained in the protection body.

The antenna portion is formed to have curved surface shape so that directionality of the antenna is expanded compared to a plain antenna for ease of radio communication.

The antenna portion is formed to have curved surface shape along cubic shape of the protection body so that directionality of the antenna is further expanded and radio communication can be carried out without fail.

Figure 8:
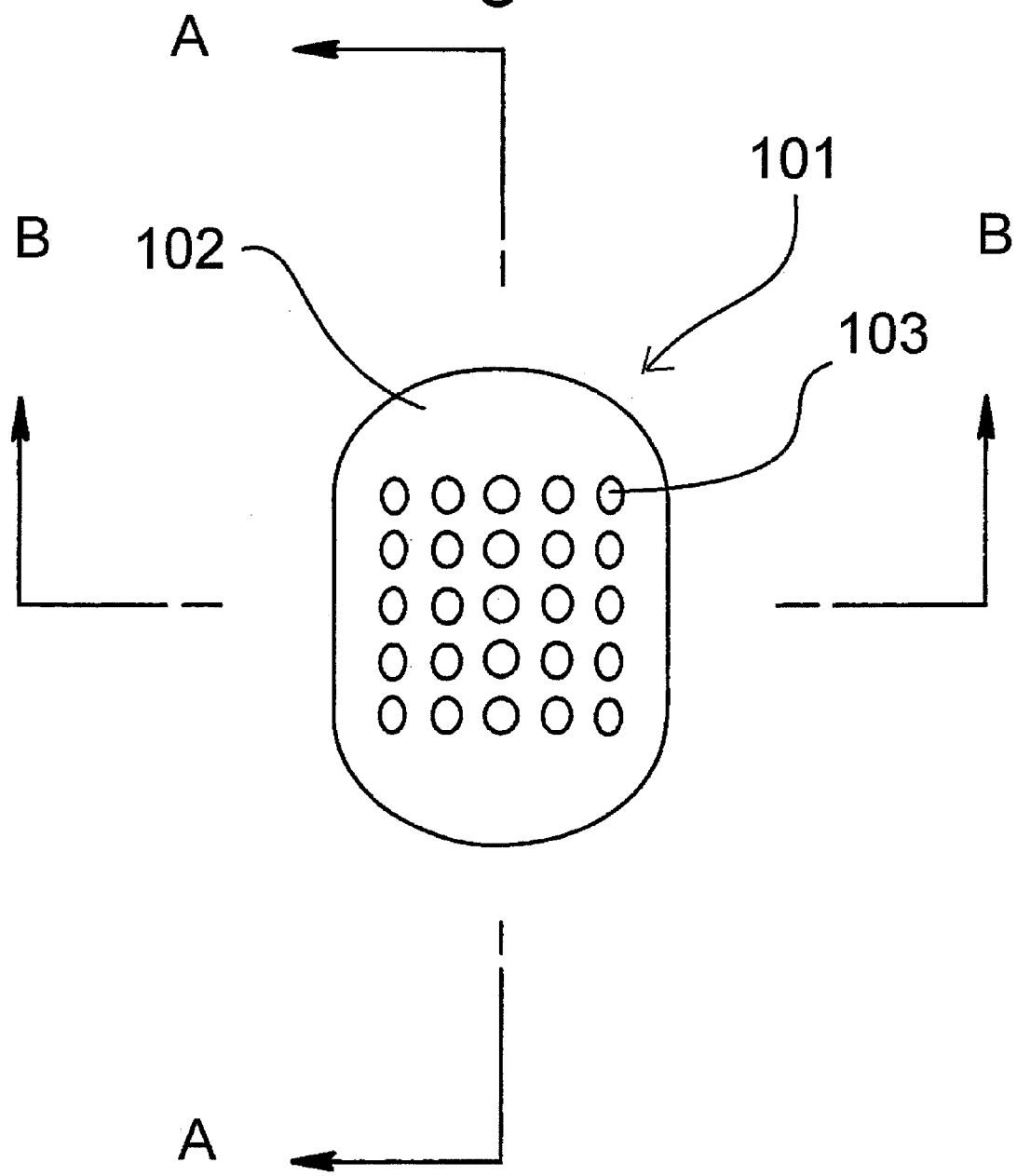
FIG. 8 A plan view of the wireless identification tag according to the third embodiment of the present invention.
Figure 9:
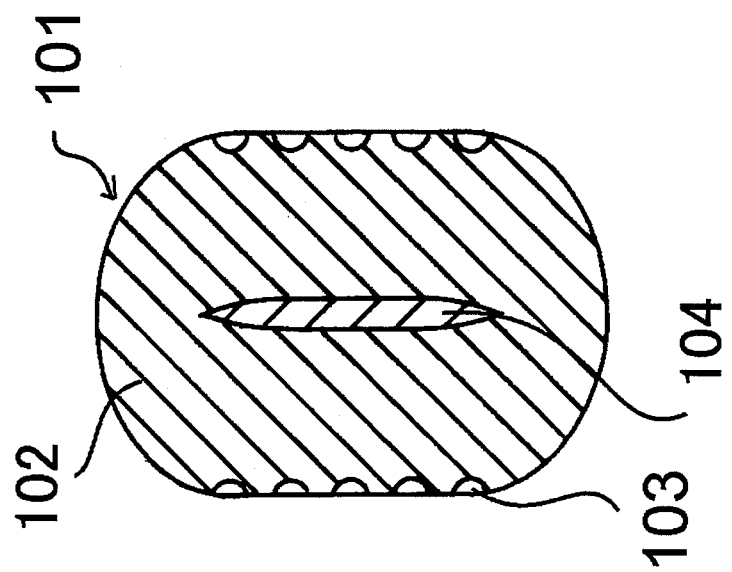
FIG. 9 A cross-sectional view of the wireless identification tag of FIG. 8, which is cut along a line A-A shown in FIG. 8.
Figure 10:
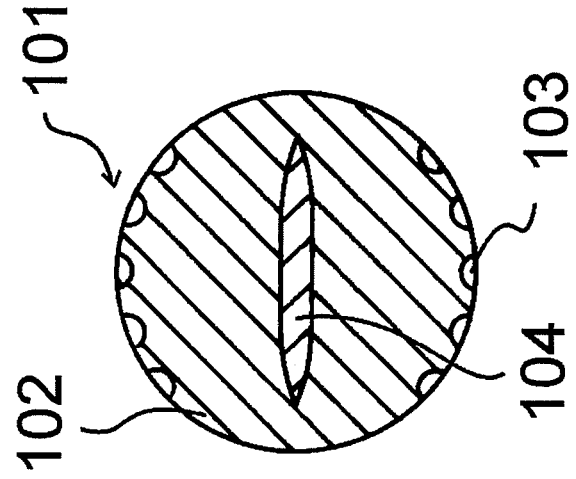
FIG. 10 A cross-sectional view of the wireless identification tag of FIG. 8, which is cut along a line B-B shown in FIG. 8.

Now, the wireless identification tag according to the third embodiment of the present invention is shown in FIGS. 8 to 10. The wireless identification tag 101 is formed by coating the wireless identification tag main body 104 consisting of an IC chip and an antenna portion with a protection body 102 consisting of a polypropylene resin material reinforced with an inorganic filler material, and by forming said protection body 102 into a schematically-cylindrical shape (bale-shaped, or barrel-shaped), both of which ends are rounded, having a size of desirably 17 mm in the length and 12 mm in the width. This size is substantially equal to the size of the aggregate to be mixed with cement product and is defined in view of the size of the antenna portion of the wireless identification tag main body to be enclosed inside the protection body. Further, a plurality of concave portions are formed by dimple processing on the surface of the protection body so that the affinity thereof with the cement product may be improved.

The resin used for forming the protection body 102 is a complex material which may be obtained by mixing both melt solutions of a polypropylene resin and an inorganic filler material. With this resin, the protection body can be strong so as to be capable of resisting against an impact imposed during mixing/kneading of unhardened concrete without requiring incorporation of glass fibers thereinto. Accordingly, the wireless identification tag enclosed inside the protection body 104 has superior resistance against an alkaline condition than the wireless identification tag 1 according to the first embodiment. Note that the protection body may be further reinforced with glass fibers having no magnetic permeability to further increase the heat-resistance and shock resistance thereof.

The wireless identification tag main body 104 to be enclosed inside the protection body 102 is an IC chip unit, in which FeRAM that is a nonvolatile memory utilizing a ferroelectric, a microcomputer, a peripheral circuit and an analog encoder/decoder are amounted on a ferrite core, said ferrite core is wound with wires so that it is formed to a ferrite core antenna. The ferrite core antenna is configured such that the communication distance thereof may be ensured by winding the primary antenna at the middle part of the plate-shaped ferrite core and the second and third antennas at both sides of the position of the primary antenna, respectively.

The wireless identification tag 101 is formed by firstly placing said wireless identification tag main body 104 into a mold for injection molding and carrying out the injection molding using a polypropylene resin reinforced with an inorganic filler material. Forming the wireless identification tag 101 in this way enables to completely coat the wireless identification tag main body 104 with the protection body 102 and to completely protect the wireless identification tag main bodies 104 inside the wireless identification tags 101 over the process of being put into a tank for mixing unhardened concrete and mixed/kneaded with cement, water, an aggregate and the like.

The wireless identification tag 101 is formed so that it has a specific gravity in a range of from 1.3 to 1.9, more preferably from 1.6 to 2.0. Accordingly, the wireless identification tags may be evenly mixed and kneaded in the cement product without causing the precipitation to and uneven dispersion in the bottom of a mixer on a vehicle and may be dispersed in the vicinity of the surface of the cement product in the sate suitable for implementing radio communication. As a consequence, it is made possible to read and write data by means of the IC tag reading/writing apparatus even after the hardening of the cement product.

The wireless identification tags, to which various informations are written, are put into an unhardened concrete mixing tank, in which they are mixed/kneaded with cement, an aggregate, sands and water at a high temperature, and then further mixed/kneaded with unhardened concrete in a mixer on a vehicle, casted together with the unhardened concrete at a construction site, and are remained inside the concrete structure until the concrete structure is broken. Therefore, it is appreciated that the wireless identification tag has strong physical strength against impact and pressure.

As generally known, concrete is a strong alkaline product, having a pH value of from 12 to 13. However, a complex material obtainable by mixing a dissolved solution consisting of a polypropylene resin and an inorganic filler material, with which the protection body for the wireless identification tag is formed, is sufficiently resistant to such a strong alkaline product.

Finally, the characteristics of the wireless identification tag 1 described in Example 1 and the wireless identification tag 101 described in the Example 2 will be explained, respectively with reference to Table 2. The wireless identification tag 1 in Example 1 is provided with the protection body consisting of a polyamide resin, called as MXD6, reinforced with glass fibers having no magnetic permeability and an inorganic filler material, and is approximately 4.8 times stronger than the wireless identification tag 101 in Example 2 when compared in the Charpy strength. On the other hand, the wireless identification tag 101 in Example 2 is enclosed inside a protection body consisting of a polypropylene resin reinforced with an inorganic filler material, which is somewhat inferior in the strength than the wireless identification tag 1 in Example 1 comprising glass fibers, but it has firm alkali-resistance because it does not contain glass fibers, which could be melt under a strong alkaline condition. On the occasion of mixing the cement product, the mixing ratio of cement, an aggregate and water to be mixed, the composition of cement, etc. will be designated strictly depending on the shape, size, location and so on of a concrete construct to be casted. Therefore, a wireless identification tag that is appropriate to the characteristic of a desired cement product may be selected.

TABLE 1

Experiment on distribution of radio frequency identification tags in concrete. Specific gravity: 1.5

| | Distance from right side of front (cm) | Distance from front (cm) | Distance from upper side of front (cm) |
|---|---|---|---|
| 1 | 30 | 3 | 10 |
| 2 | 40 | 10 | 10 |
| 3 | 30 | 10 | 10 |
| 4 | 40 | 10 | 15 |
| 5 | 50 | 10 | 15 |
| 6 | 84 | 9 | 15 |
| 7 | 55 | 15 | 20 |
| 8 | 65 | 15 | 25 |
| 9 | 20 | 7 | 30 |
| 10 | 40 | 7 | 30 |
| 11 | 75 | 2 | 30 |
| 12 | 80 | 14 | 45 |

TABLE 2

| Material | | first embodiment Reny (Standing product) | third embodiment Prime PP |
|---|---|---|---|
| Manufacturer | | Mitsubishi Engineering | Prime Polymer |
| Grade | | 1002HUS | J705UG |
| Specific gravity | | 1.49 | 0.91 |
| Mold constriction rate [%] | | 0.35 | 1.4-1.8 |
| Temperature of deflection under load | | 237 | 105 |
| Tensile modulus [MPa] | | 15,000 | 1,450 |
| Flexural modulus [MPa] | | 13,100 | — |

TABLE 2-continued

| Material | | first embodiment Reny (Standing product) | third embodiment Prime PP |
|---|---|---|---|
| Charpy impact strength | Without notch | 48 | 10 |
| | With notch | 7 | — |
| Melting point [° C.] | | 243 | 160-165 |
| Glass fibers | | Contained | Not contained |
| Acid-resistant/Alkali-resistant property | | ○/△ | ○/○ |

DESCRIPTION OF THE REFERENCE NUMERALS

| 1. | Wireless identification tag |
| 2. | Protection body |
| 3. | Concave portion |
| 4. | Wireless identification tag main body |
| 5. | Wireless identification tag |
| 51. | FeRAM |
| 52. | Power source unit |
| 53. | Antenna portion |
| 54. | Control unit |
| 6. | Coating body |
| 7. | Concrete quality management system |
| 8. | Central management server |
| 9. | Mixer truck |
| 10. | IC tag write-in unit |
| 11. | IC tag read-out unit |
| 110 | Wireless identification tag |
| 102 | Protection body |
| 103 | Concave portion |
| 104 | Wireless identification tag main body |

The invention claimed is:

1. A wireless identification tag mixed in a cement product in a manufacturing procedure thereof in which cement, an aggregate, and water, are mixed, said wireless identification tag comprising:
   a main body having an antenna portion which can write/read information by radio communication; and
   a protection body covering the main body,
   wherein a plurality of concave portions are provided on a surface of the protection body,
   wherein the protection body is formed of an alkali-resistant polyamide resin reinforced by inorganic fillers, such that the alkali-resistant polyamide resin is not reinforced by glass fibers,
   wherein a size of the wireless identification tag is approximately the same as a size of the aggregate,
   wherein a depth of each of the concave portions is in a range of from approximately 0.2 mm to approximately 0.5 mm, and
   wherein a specific gravity of the wireless identification tag is in a range of from 1.3 to 1.9.

2. The wireless identification tag according to claim 1, wherein the plurality of concave portions provided on the surface of the protection body comprise a plurality of dimples that are formed by dimple processing.

3. The wireless identification tag according to claim 2, wherein the wireless identification tag is formed to have an approximately oval shape, with a length of approximately 17 mm and a width of approximately 12 mm.

4. The wireless identification tag according to claim 1, wherein the wireless identification tag is formed to have an approximately oval shape, with a length of approximately 17 mm and a width of approximately 12 mm.

5. The wireless identification tag according to claim 1, wherein the protection body has a sphere, oval or polyhedron cubic shape.

6. The wireless identification tag according to claim 1, wherein the main body of the wireless identification tag includes a semiconductor memory device, which has semiconducting material having a nonvolatile function, and a power source unit for generating electric current without incorporation of a battery by resonating with received radio waves.

7. The wireless identification tag according to claim 6, wherein the semiconductor memory device is a ferroelectric random access memory (FeRAM).

8. The wireless identification tag according to claim 1, wherein the main body of the wireless identification tag has a chip shape, and includes a semiconductor substrate for mounting a semiconductor which is covered with an insulating material.

9. The wireless identification tag according to claim 1, wherein the antenna portion is formed to have a curved surface shape.

10. The wireless identification tag according to claim 1, wherein the antenna portion is formed to have a curved surface shape along a cubic shape of the protection body.

11. The wireless identification tag according to claim 1,
wherein the antenna portion includes a plate-shaped ferrite core, a primary antenna, a second antenna and a third antenna,
wherein the primary antenna is wound at a middle portion of the plate-shaped ferrite core,
wherein the second antenna is wound at a portion of the plate-shaped ferrite core that is adjacent to one side of the middle portion of the plate-shaped ferrite core, and
wherein the third antenna is wound at another portion of the plate-shaped ferrite core that is adjacent to another side of the middle portion of the plate-shaped ferrite core.

12. A wireless identification tag adapted to be mixed in a cement product in a manufacturing process, in which cement, an aggregate, and water, are mixed, said wireless identification tag comprising:
a wireless identification tag main body; and
a protection body covering the wireless identification tag main body;
wherein the wireless identification tag main body includes an antenna portion capable of writing and reading information via radio communication and being enclosed inside the protection body,
writing and reading information via radio communication and being enclosed inside the protection body,
wherein a plurality of concave portions are formed on a surface of the protection body,
wherein the protection body consists of an alkali-resistant polypropylene resin reinforced with an inorganic filler material, such that the alkali-resistant polypropylene resin is not reinforced by glass fibers,
wherein the wireless identification tag is formed in an approximately same size as that of the aggregate,
wherein a depth of each of the concave portions is in a range of from approximately 0.2 mm to approximately 0.5 mm, and
wherein a specific gravity of the wireless identification tag is in a range of from 1.3 to 1.9.

13. The wireless identification tag according to claim 12, wherein the concave portions on the surface of the protection body are provided by forming a plurality of recesses on the surface of the protection body by dimple processing.

14. The wireless identification tag according to claim 12, wherein the wireless identification tag is formed in a schematically-cylindrical or barrel shape.

15. The wireless identification tag according to claim 14, wherein the wireless identification tag is formed to have a length of 17 mm and a diameter of 12 mm.

16. The wireless identification tag according to claim 12, wherein the wireless identification main body includes a semiconductor memory device comprising a semiconducting material and being provided with a nonvolatile function and a power source section that resonates with received radio waves to generate electricity without requiring an installation of a battery therein.

17. The wireless identification tag according to claim 12, wherein a ferrite core antenna is used for the antenna portion.

18. A wireless identification tag mixed in a cement product in a manufacturing procedure thereof in which cement, an aggregate, and water, are mixed, said wireless identification tag comprising:
a main body having an antenna portion which can write/read information by radio communication; and
a protection body covering the main body, wherein a plurality of concave portions are provided on a surface of the protection body,
wherein the protection body is formed of an alkali-resistant polyamide resin reinforced by inorganic fillers, such that the alkali-resistant polyamide resin is not reinforced by glass fibers,
wherein a size of the wireless identification tag is approximately the same as a size of the aggregate,
wherein each of the concave portion is a concave lens shape and has a depth in a range of from approximately 0.2 mm to approximately 0.5 mm, and
wherein a specific gravity of the wireless identification tag is in a range of from 1.3 to 1.9.

* * * * *